(12) United States Patent
Waninger

(10) Patent No.: US 9,062,730 B2
(45) Date of Patent: Jun. 23, 2015

(54) INTERNALLY VENTILATED BRAKE DISK FOR DISK BRAKES

(75) Inventor: Robert Waninger, Ingolstadt (DE)

(73) Assignee: AUDI, Ingolstadt (DE)

( * ) Notice: Subject to any disclaimer, the term of this patent is extended or adjusted under 35 U.S.C. 154(b) by 757 days.

(21) Appl. No.: 12/247,453

(22) Filed: Oct. 8, 2008

(65) Prior Publication Data

US 2009/0095582 A1 Apr. 16, 2009

(30) Foreign Application Priority Data

Oct. 10, 2007 (DE) .......................... 10 2007 048 442

(51) Int. Cl.
*F16D 65/12* (2006.01)
*F16D 65/847* (2006.01)
*F16D 65/02* (2006.01)

(52) U.S. Cl.
CPC ............ *F16D 65/128* (2013.01); *F16D 65/847* (2013.01); *F16D 2065/1328* (2013.01)

(58) Field of Classification Search
CPC .......... F16D 65/128; F16D 2065/1328; F16D 2065/788
USPC .......................... 188/218 XL, 18 A; D12/180
See application file for complete search history.

(56) References Cited

U.S. PATENT DOCUMENTS

| 4,712,656 A | 12/1987 | Courtois |
| 5,427,212 A * | 6/1995 | Shimazu et al. ........ 188/218 XL |
| 5,878,848 A * | 3/1999 | Zhang .................... 188/218 XL |
| 6,536,564 B1 | 3/2003 | Garfinkel et al. |
| 7,097,006 B2 * | 8/2006 | Veneziano et al. ...... 188/218 XL |
| 7,100,748 B2 * | 9/2006 | Prahst ..................... 188/218 XL |
| 7,267,210 B2 | 9/2007 | Cornolti et al. |
| 2005/0269174 A1 * | 12/2005 | Lin ......................... 188/218 XL |

FOREIGN PATENT DOCUMENTS

| DE | 1 038 593 | 3/1959 |
| EP | 1 445 507 B1 | 3/2006 |
| GB | 1 411 205 | 10/1975 |
| GB | 2 293 866 A | 4/1996 |
| WO | WO 2007/010569 A1 | 1/2007 |

* cited by examiner

*Primary Examiner* — Bradley King
(74) *Attorney, Agent, or Firm* — Novak Druce Connolly Bove + Quigg LLP

(57) ABSTRACT

The invention relates to an internally ventilated brake disk for disk brakes, in particular for motor vehicles, having two friction disks that are arranged adjacent to one another, that are connected to one another by webs that have an essentially radial, preset curvature, and that form cooling channels between them for cooling air, and that are separated from one another in the peripheral direction. According to the invention, the webs in each case extend along a preset curve section of a web curve that has a preset curvature, with the individual web curves, separated from one another in the peripheral direction and extending between an outer peripheral edge and an inner peripheral edge, have an essentially identical design.

2 Claims, 1 Drawing Sheet

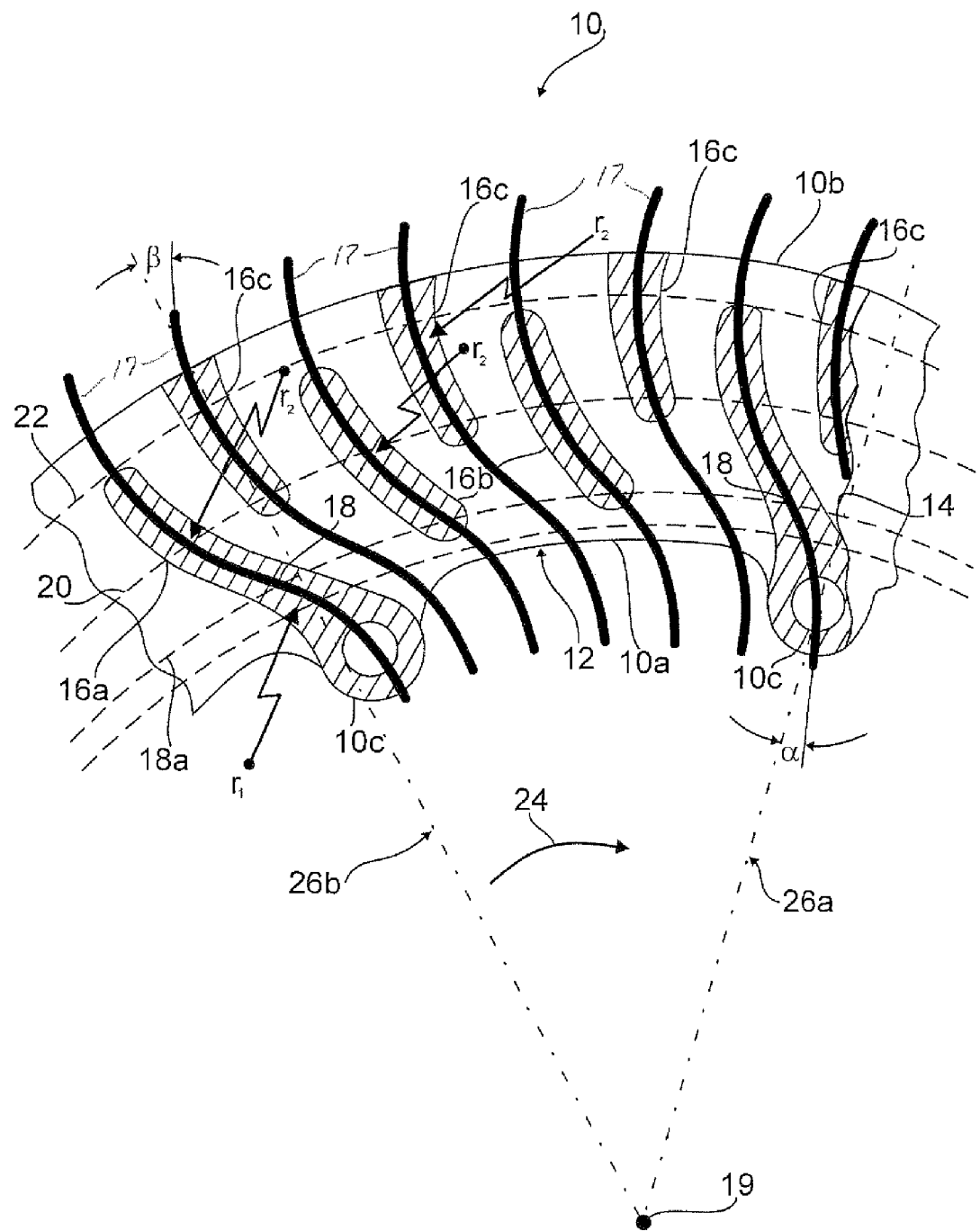

INTERNALLY VENTILATED BRAKE DISK FOR DISK BRAKES

CROSS-REFERENCE TO RELATED APPLICATIONS

This application claims priority from German Patent Application No. 10 2007 048 442.0 filed Oct. 10, 2007.

The invention relates to an internally ventilated brake disk for disk brakes, in particular for motor vehicles.

BACKGROUND OF THE INVENTION

EP 1 445 507 B1, in which multiple webs of different chord lengths between two friction disks that are axially separated from one another delimit essentially radial cooling ducts, shows such an internally ventilated brake disk. The shape of the webs and their arrangement determine decisively the specific throughput in cooling air or the achievable cooling capacity as well as the necessary rigidity and strength of the brake disk.

The object of the invention is to propose a brake disk of the generic type that is further optimized virtually without additional expense with respect to the achievable cooling capacity.

SUMMARY OF THE INVENTION

According to the invention, the webs extend in each case along a preset curve section of a web curve that has a preset curvature, whereby the individual web curves that extend separated from one another in the peripheral direction and in particular between an outer peripheral edge and an inner peripheral edge of the brake disk or the friction disks in each case have an essentially identical design or curve geometry; in particular, the web curves have an S-shaped curvature geometry and/or are arranged equidistant from one another viewed in the brake disk's peripheral direction. As a result, in the case of simple manufacturing, a brake disk, in particular an internally ventilated brake disk for disk brakes that allows for an excellent cooling capacity of the brake disk, can be designed. In this case, the design expense as well as the manufacturing expense for the webs along the respective web curve sections can be advantageously reduced by the identical web curve geometry.

In particular, it can be provided in such a way that at least one part of the individual web extends along different curve sections; in particular, the webs can be divided into webs that vary with respect to their length of extension and/or their curve section in order to form a cooling capacity of an internally ventilated brake disk that can be matched in an excellent and individual manner to the respective conditions. In particular, this is achieved by forming three different groups of webs, the primary webs, secondary webs, and tertiary webs, which in each case have a different length.

According to a preferred constructive embodiment of the invention, it is proposed to design longer primary webs, which are guided to the inner peripheral edge of the friction disks, but end before their outer peripheral edge, with, in contrast, the shorter secondary webs, viewed in the radial direction, being arranged approximately in the middle relative to the friction disks and ending before the inner peripheral edge and the outer peripheral edge of the brake disk. Further, with regard to the secondary webs, shorter tertiary webs can also be provided that preferably end approximately in the middle relative to the friction disks, viewed on the outer peripheral edge of the friction disks and in the radial direction. As empirical tests have also shown, it is possible with these measures to further improve the specific throughput in cooling air or the cooling capacity of the brake disk to a not inconsiderable extent, with the number of webs or the manufacturing expense of the brake disk remaining virtually the same.

Advantageously, five webs that consist of secondary webs and tertiary webs can be arranged alternating between each two primary webs; in particular in this case, each two secondary webs can be arranged between three tertiary webs. This produces an especially rigid and sturdy embodiment of the brake disk even in the case of high brake forces and temperatures, on the one hand, and a flow-promoting equalization of the inflow cross-sections on the inner periphery and the discharge cross-sections on the outer periphery of the brake disk, on the other hand.

Extensive-optimization of the cooling properties and the strength criteria of the brake disk can be achieved when the extension length of the primary webs has a negative (in the direction of rotation of the brake disk) curvature section and a positive (opposite to the direction of rotation of the brake disk) curvature section, while the secondary webs and the tertiary webs are designed only positively curved. In this case, the points of inflection of the curvature sections of the primary webs and the radial ends of the secondary webs can lie essentially on a common circular line.

In addition, the radial inner ends of the tertiary webs can be extended out via the force application radius that lies approximately in the center of the friction disks, and the radial outer ends of the secondary webs lie essentially on a circular path that also includes the radial outer ends of the primary webs and that is situated by a distance of at least one web's width from the outer periphery of the brake disk.

To optimize the cooling capacity of the brake disk further, the angle of the primary webs on the inner peripheral edge of the brake disk can be between 0 and 20 degrees, in particular between 12 degrees to 17 degrees, relative to a tangential beam that is applied through this area starting from the brake disk center. Also, the angle of the tertiary webs guided to the outer peripheral edge of the brake disk can be between 0 and 30 degrees, in particular between 10 and 22 degrees, relative to a tangential beam that is applied through this area from the brake disk center. Finally, the curvature radius of the radial, outer, positive curvature sections of the primary webs that are inclined opposite to the direction of rotation of the brake disks in, e.g., forward travel, and the curvature radius of the secondary webs and the tertiary webs can be made the same.

BRIEF DESCRIPTION OF THE DRAWING

The diagrammatic drawing shows a partial cross-section through the webs of an internally ventilated brake disk for motor vehicles.

DETAILED DESCRIPTION OF THE PREFERRED EMBODIMENTS OF THE INVENTION

The drawing shows a segment of an internally ventilated brake disk 10 for motor vehicles, of which, however, essentially only one annular friction disk 12 can be seen. The second, axially adjacent friction disk. 14 is indicated diagrammatically only on the right edge of the drawing.

The two friction disks 12, 14 of the brake disk 10 are connected to one another by means of webs 16, with essentially radial cooling channels (without reference numbers) being delimited between the webs 16. The cooling channels extend in each case from the inner peripheral edge 10a to the outer peripheral edge 10b of the brake disk 10.

Also, on the inner peripheral edge 10a of the brake disk 10, fastening lugs 10c are molded on, lugs in which holes are made via which the brake disk 10 can be fastened to a wheel flange, not shown, of a wheel suspension of a motor vehicle.

The webs 16 of the brake disk 10 are distributed in a symmetrical arrangement over the entire periphery thereof. Differently designed primary webs 16a, secondary webs 16b, and tertiary webs 16c extend along a preset curve section of a web curve 17, which has here an approximately S-shaped curve geometry. In each case, the web curves 17 have an identical curve shape, and, moreover, preferably viewed in the peripheral direction, are also equidistant from one another.

The longer primary webs 16a extend, as can be seen from the drawing, along a preset curve section of the respectively associated web curve 17 up to the inner peripheral edge 10a of the brake disk 10, but they end here at a distance of approximately the primary web width in front of the outer peripheral edge 10b of the brake disk 10.

The primary webs 16a, which undergo transition into the fastening lugs 10c in each case on the inner peripheral edge 10a, also have a curvature section with a negative curvature radius $r_1$ (curved in the direction of rotation 24) and a radial outer curvature section with a positive curvature radius $r_2$ (curved opposite to the direction of rotation 24), which undergo-transition into one another at a point of inflection 18. The points of inflection 18 of the primary webs 16a in this case lie on a common circular path 18a of the brake disk 10 around their disk center 19.

Between each two primary webs 16a, three tertiary webs 16c and two secondary webs 16b are arranged at the same peripheral distances, with two tertiary webs 16c being directly adjacent in each case to the primary webs 16a, as can be seen.

The tertiary webs 16c extend from the outer peripheral edge 10b of the brake disk 10 radially inward and end approximately at the center of the friction disks 12, 14, whereby they extend beyond the dynamic force application radius (circular line 20 indicated in dots and dashes), however.

The shorter secondary webs 16b that are arranged in each case between the tertiary webs 16c are arranged approximately in the center of the friction disks 12, 14 and symmetrically to the circular line 20, and they end, as can be seen from the drawing, in front of the inner peripheral edge 10a and the outer peripheral edge 10bb of the brake disk 10 at a distance that roughly corresponds to their web's width. In addition, the secondary webs 16b end radially inward, for example, in the area of the circular line 18a of the points of inflection 18 of the primary webs 16b and radially outward on a circular path 22 also including the ends of the primary webs 16a.

The webs 16 preferably have essentially a uniform web's width. In addition, the secondary webs 16b and the tertiary webs 16c are embodied with the same, positive curvature radius $r_2$, as is the case in the radial outer curvature section $r_2$ of the primary webs 16a.

In this case, the primary webs 16a are on the inner peripheral edge 10a of the brake disk 10 and thus the radial inner web curve sections are inclined as a tangential beam 26a relative to a straight line running through the center of the circle 19 and the radial inner web curve section, such that said webs form between them an angle of between 0 and 20 degrees, in particular about 15 degrees.

Furthermore, the angle β of the radial outer tertiary web end sections of the tertiary webs 16c that are guided to the outer peripheral edge 10b of the brake disk 10 relative to a straight line that is applied through the center of the circle 19 and the radial outer tertiary web end section as a tangential beam 26b is preferably between 0 and 30 degrees, in particular about 20 degrees.

The invention claimed is:

1. A friction disk brake comprising:
   a repeating pattern of webs,
   wherein the repeating pattern of webs comprises, in sequence:
     a primary web,
     a first tertiary web,
     a first secondary web,
     a second tertiary web,
     a second secondary web, and
     a third tertiary web,
   wherein the primary web is longer than the first secondary web and the second secondary web,
   wherein the first secondary web and the second secondary web are each longer than the first tertiary web, the second tertiary web, and the third tertiary web,
   wherein each of the primary web, the first secondary web, the second secondary web, the first tertiary web, the second tertiary web, and the third tertiary web have a positive curvature, curving in a direction of rotation of the friction disk,
   wherein the primary web also has a negative curvature, curving in a direction opposite to the direction of rotation of the friction disk,
   wherein the positive curvature and the negative curvature of the primary web result in an s-shaped configuration,
   wherein the primary web extends from an inner edge of the friction disk to a first path on a surface of the friction disk,
   wherein the s-shaped configuration of the primary web has an inflection point lying on a second path on the surface of the friction disk,
   wherein the first secondary web and the second secondary web each extend from the first path to the second path,
   wherein the first tertiary web, the second tertiary web, and the third tertiary web each extend from an outer edge of the friction disk to a third path on the surface of the friction disk,
   wherein the first path, the seconded path, and the third path are approximately concentric circles,
   wherein the first path has a first circumference,
   wherein the second path has a second circumference that is less than the first circumference,
   wherein the third path has a third circumference that is less than the first circumference and greater than the second circumference.

2. The friction disk according to claim 1, further comprising a set of circumferentially spaced fastening lugs, and each primary web in the repeating pattern of webs extends across an aligned one of said lugs.

* * * * *